US008375836B2

(12) United States Patent
Kani et al.

(10) Patent No.: US 8,375,836 B2
(45) Date of Patent: Feb. 19, 2013

(54) CUTTING DEVICES

(75) Inventors: Toshiyuki Kani, Anjo (JP); Goh Yamamura, Anjo (JP)

(73) Assignee: Makita Corporation, Anjo (JP)

( * ) Notice: Subject to any disclaimer, the term of this patent is extended or adjusted under 35 U.S.C. 154(b) by 708 days.

(21) Appl. No.: 12/458,414

(22) Filed: Jul. 10, 2009

(65) Prior Publication Data

US 2010/0005938 A1 Jan. 14, 2010

(30) Foreign Application Priority Data

Jul. 14, 2008 (JP) .................................. 2008-182416

(51) Int. Cl.
*B23D 45/04* (2006.01)
(52) U.S. Cl. .......................... 83/486.1; 83/471.3; 83/490
(58) Field of Classification Search .................. 83/471.2, 83/471.3, 472, 473, 477, 477.1, 477.2, 483, 83/485–489, 581, 582, 585, 490; 74/30, 74/130, 167, 169
See application file for complete search history.

(56) References Cited

U.S. PATENT DOCUMENTS

| | | | | |
|---|---|---|---|---|
| 3,085,452 A | * | 4/1963 | Thompson | 74/822 |
| 3,459,057 A | * | 8/1969 | Bonneric | 74/89.3 |
| 4,958,544 A | * | 9/1990 | Miyamoto | 83/471.3 |
| 5,054,352 A | * | 10/1991 | Fushiya et al. | 83/468.3 |
| 5,392,678 A | * | 2/1995 | Sasaki et al. | 83/471.3 |
| 5,870,939 A | * | 2/1999 | Matsubara | 83/471.3 |
| 6,997,091 B1 | | 2/2006 | Shibata | |
| 2009/0301278 A1 | * | 12/2009 | Agan et al. | 83/471.3 |
| 2009/0315237 A1 | * | 12/2009 | Thomas et al. | 269/63 |

FOREIGN PATENT DOCUMENTS

| | | |
|---|---|---|
| EP | 1 632 324 A1 | 3/2006 |
| JP | A 9-131701 | 5/1997 |
| JP | B2-3345236 | 8/2002 |
| JP | B2-3549732 | 4/2004 |
| SU | 673431 | 7/1979 |

OTHER PUBLICATIONS

European Search Report issued in EP 09009172.9, mailed Feb. 18, 2011.
Office Action issued in Russian Application No. 2009126938/02(037475), dated Oct. 18, 2010.

* cited by examiner

*Primary Examiner* — Kenneth E. Peterson
(74) *Attorney, Agent, or Firm* — Oliff & Berridge, PLC

(57) ABSTRACT

The present invention includes a cutting device including a table and a cutting unit disposed on an upper side of the table and vertically movably supported by the table via a slide mechanism. The slide mechanism enables the cutting unit to slide in a sliding direction relative to the table within a plane substantially parallel to a surface of the table. A slide lock mechanism can lock and unlock the sliding movement of the cutting unit and includes an operation member operable to slide for locking and unlocking the sliding movement.

3 Claims, 7 Drawing Sheets

CUTTING DEVICES

This application claims priority to Japanese patent application serial number 2008-182416, the contents of which are incorporated herein by reference.

BACKGROUND OF THE INVENTION

1. Field of the Invention

The present invention relates to cutting devices having tables (hereinafter also called "table cutting devices"), such as slide circular saws.

2. Description of the Related Art

Table cutting devices are known that include a table for placing a workpiece thereon and a cutting unit vertically movably supported on the table. The cutting unit includes a circular cutting blade rotatably driven by an electric motor as a drive source. As the cutting unit moves downward, the rotating blade cuts into a workpiece, so that a cutting operation can be performed. In some known cutting devices, the cutting unit can move to slide in a direction parallel to the table surface (hereinafter called "table surface direction") in addition to the movement in the vertical direction. The cutting devices having the sliding function can be used to cut a workpiece having a large size by first vertically downwardly moving the saw unit to bring the rotating blade to cut into the workpiece and thereafter slidably moving the saw unit in the table surface direction.

In order to slidably support the saw unit to be able to move in the table surface direction, it has been known to incorporate a slide mechanism that includes two parallel slide bars extending along a lower surface of the table and slidably supporting the saw unit. In general, in the case that this type of slide mechanism is incorporated, a slide lock mechanism for locking the saw unit at a desired sliding position is also provided. Japanese Laid-Open Patent Publication No. 9-131701 (U.S. Pat. No. 3,345,236) and Japanese Laid-Open Patent Publication No. 11-90730 (U.S. Pat. No. 3,549,732) disclose known slide lock mechanisms. By incorporating the slide lock mechanism, even a workpiece having a small size can be readily reliably cut because the cutting unit can be locked at a desired sliding position in the table surface direction.

However, the above known slide lock mechanisms use an operation member (threaded shaft or a stopper screw) that is rotated to axially move for directly contacting with the slide bar or for pressing a block-like stopper member against the slide bar. Therefore, it is necessary for an operator to turn the operation member a number of times by pinching the operation member with his or her fingertips.

Therefore, there is a need in the art for table cutting devices having slide lock mechanisms that are improved in operability.

SUMMARY OF THE INVENTION

One aspect according to the present invention includes a cutting device including a slide lock mechanism that can lock and unlock the sliding movement a cutting unit. The slide lock mechanism includes an operation member operable to slide for locking and unlocking the sliding movement.

DETAILED DESCRIPTION OF THE INVENTION

Figure 1:
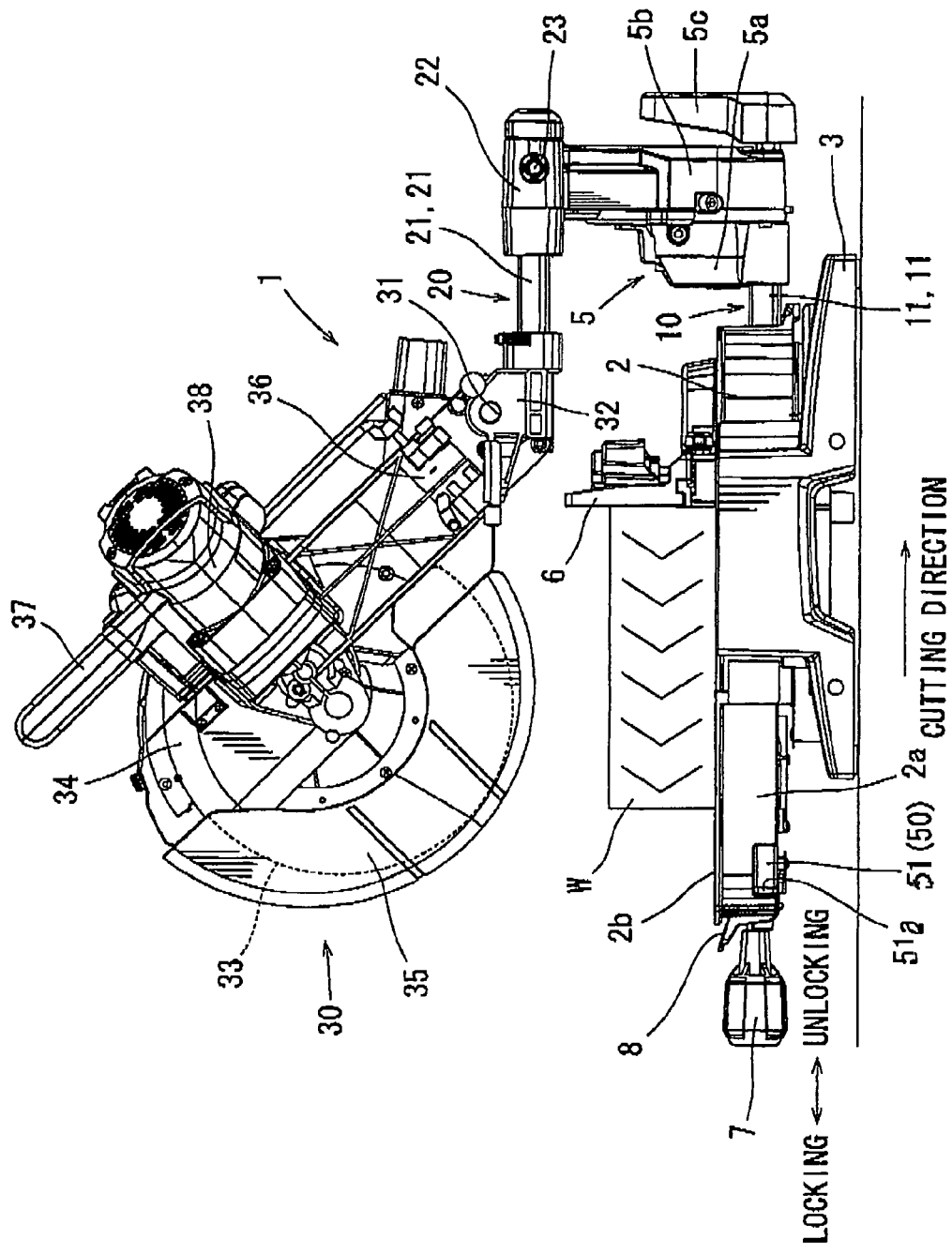
FIG. 1 is a side view of a cutting device according to a first embodiment of the present invention.

Each of the additional features and teachings disclosed above and below may be utilized separately or in conjunction with other features and teachings to provide improved cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a cutting device includes a table configured to be able to place a workpiece thereon and a cutting unit disposed on an upper side of the table and vertically movably supported by the table via a slide mechanism. The slide mechanism is configured to enable the cutting unit to slide in a sliding direction relative to the table within a plane substantially parallel to a surface of the table. A slide lock mechanism is configured to be able to lock and unlock the sliding movement of the cutting unit and includes an operation member operable to slide for locking and unlocking the sliding movement. With this arrangement, the lock and unlock operations of the slide lock mechanism can be easily performed by simply sliding the operation lever. Therefore, the operability of the slide lock mechanism can be improved. Here, the direction of the sliding operation of the operation member may be any of directions. For example, the sliding direction may be upward, downward, forward, rearward, leftward or rightward direction. In addition, the sliding operation may be a pivotal operation, linear moving operation or any other moving direction except for a rotational operation.

The operation member may be disposed at a front position on a side of an operator with respect to the sliding direction, so that the operator can readily access the operation member. With this arrangement, the lock and unlock operations of the slide lock mechanism can be easily performed. Hence, the operability can be further improved.

The slide mechanism may include a slide bar slidably disposed along a lower surface of the table, so that the cutting unit can slid in the sliding direction relative to the table via the slide bar. The slide lock mechanism may further include a stopper member and a stopper moving mechanism operable to move the stopper member between a lock position and an unlock position. When the stopper member is in the lock position, the stopper member engages the slide bar for preventing the sliding movement of the slide bar. When the stopper member is in the unlock position, the stopper member permits the sliding movement of the slide bar. With this arrangement, the stopper moving mechanism enables a remote control of the stopper member.

In one embodiment, the stopper member may be a stopper screw. The stopper moving mechanism includes a pinion gear mounted to the stopper screw and a rack engaging with the pinion gear and coupled to the operation member. When the operation member is slid to move in a first position, the rack moves to cause the stopper screw to move to the lock position where the stopper screw abuts to the slide bar. When the operation member is slid to move in a second position opposite to the first direction, the rack moves to cause the stopper screw to move to the unlock position where the stopper screw permits the sliding movement of the slide bar. By utilizing a rack and pinion mechanism as the stopper moving mechanism in this way, it is possible to improve the operability of the slide lock mechanism.

The operation member may be disposed at a front position on a side of an operator with respect to the sliding direction, so that the operator can readily access the operation member. The slide lock mechanism may further include an operation lever coupled between the operation member and the rack, so that the movement of the operation member is transmitted to the rack via the operation lever. With this arrangement, the operator can easily access the operation member, and therefore, the operability can be further improved.

In another embodiment, the stopper member is an annular stopper ring having an inner circumferential side and fitted around the slide bar. When the stopper ring is in the lock position, the inner circumferential side of the stopper ring is pressed against the slide bar. When the stopper ring is in the unlock position, the inner circumferential side of the stopper ring is spaced from the slide bar.

In another embodiment, the stopper member includes a first stopper ring and a second stopper ring each having an annular configuration, having an inner circumferential side and fitted around the slide bar. In the lock position, the inner circumferential side of each of the first and second stopper rings is pressed against the slide bar. In the unlock position, the inner circumferential side of each of the first and second stopper rings is spaced from the slide bar. The stopper moving mechanism is configured to incline the first and second stopper rings in opposite directions to each other when the first and second stopper rings are in the lock position. With this arrangement, it is possible to reliably lock the sliding movement in either direction.

First and second embodiments of the present invention will now be described with reference to FIGS. 1 to 8. First, the first embodiment will be described with reference to FIGS. 1 to 3. FIG. 1 shows a table cutting device 1 in an overall view. An operator may be positioned on the left side as viewed in FIG. 1 of the table cutting device 1 in order to perform various operations in relation to the table cutting device 1. For example, the operator first pivot a cutting unit 30 of the table cutting device 1 downward and then move the cutting unit 30 to slide from the left side (on the side of the operator) to the right side as viewed in FIG. 1, so that a cutting operation of a workpiece W is performed. In this specification, this direction of the movement of the cutting unit 30 from the left side to the right side as viewed in FIG. 1 for cutting the workpiece W will be hereinafter called "cutting direction" or "cutting proceeding direction." In addition, in this specification, the terms "front side" or "forward", "rear side" or "rearward", "left side" or "leftward and "right side" or "rightward" are used to mean the sides or directions with reference to a position of the operator unless otherwise specified. Therefore, the left side and the right side as viewed in FIG. 1 will be called as the front side and the rear side, respectively.

The table cutting device 1 includes a table 2 on which the workpiece W is placed, a base 3 horizontally rotatable supporting the table 2, and the cutting unit 30 supported on the rear side of the table 2 via a left and right pivotal support mechanism 5 and upper and lower slide mechanism 10 and 20.

The table 2 is supported on the upper surface of the base 3 so as to be rotatable within a horizontal plane. A fence 6 is disposed on the upper surface of the table 2 for positioning the workpiece W with respect to a table surface direction (i.e., a direction parallel to the upper surface of the table 2). An extension 2a extends from the front side of the table 2 toward the side of the operator. A blade intrusion plate 2b is mounted on the upper surface of the extension 2a and the upper surface of the table 2 to extend therebetween and includes a blade intrusion slot allowing a saw blade 33 to pass therethrough.

A grip 7 and a lever 8 are mounted to the front end of the extension 2a. The grip 7 can be grasped by the operator for turning the table 2. The lever 8 can be pivoted vertically by the operator. The grip 7 serves as a part of a first stopper mechanism and the lever 8 serve as a part of a second stopper mechanism that is different from the first stopper mechanism. The first stopper mechanism is operable to fix the rotational position of the table 2 at a desired position by way of a stopper bolt (not shown) that can abut to the table 2. The second stopper mechanism is operable to fix the rotational position of the table 2 at any of predetermined positions by way of a stopper rod (not shown) and stopper holes (not shown) formed in the table 2 and spaced form each other by a predetermined angle. The grip 7 is mounted to the stopper bolt, and as the grip 7 is rotated in a tightening direction of the stopper bolt, the stopper bolt abuts to the circumferential surface of the table 2, so that the table 2 can be fixed at a desired rotational position. One the other hand, the lever 8 is associated with the stopper rod. When the lever 8 is pivoted downward from a lock position to an unlock position, the stopper rod is removed from the corresponding stopper hole, so that the table 2 is allowed for rotation. When the operator releases the lever 8 after pivoting to the unlock position, the lever 8 returns upward to the lock position, so that the table 2 can be again locked. Therefore, the operator can fix the table 2 at any desired rotational position or at one of predetermined rotational positions by operating the grip 7 or the lever 8 positioned at the front end of the extension 2a, which is close to the operator.

The lower slide mechanism 10 includes two slide bars 11 as primary components. The slide bars 11 are supported on the lower surface of the table 2 and extend parallel to each other. The left and right pivotal support mechanism 5 is supported on the rear ends of the slide bars 11. The pivotal support mechanism 5 includes a fixed member 5a mounted to the rear ends of the slide bars 11 and a pivotable member 5b coupled to the fixed member 5a via a pivotal support shaft (not shown), so that the pivotable member 5b can pivot in right and left directions relative to the fixed member 5a. The pivotal axis of the pivotable member 5b or the axis of the pivotal support shaft is parallel to the cutting proceeding direction and extends within a plane including the upper surface of the table 2. A fixing lever 5c is mounted to the rear portion of the pivotable member 5b. When the fixing lever 5c is tightened in a lock direction, the pivotable member 5b can be fixed in position relative to the fixed member 5a, so that the cutting unit 30a can be fixed with respect to right or left pivoted position. When the fixing lever 5c is loosened to move to an unlock direction, the cutting unit 30 is allowed for pivotal movement in the right or left direction. Therefore, it is possible to perform an oblique cutting operation with the cutting unit 30 inclined in the right or left direction by a predetermined angle relative to a vertical direction.

The upper slide mechanism 20 is supported on the upper portion of the pivotable member 5b. Also, the upper slide mechanism 20 includes two parallel slide bars 21 as primary components. The slide bars 21 are supported on the upper portion of the pivotable member 5b via a bearing portion 22 such that the slide bars 21 can slidably move in front and rear directions relative to the pivotable member 5b. The position of the slide bars 21 (i.e., a position of the cutting unit 30) relative to the pivotal member 5b can be fixed by tightening a stopper screw 23.

A bracket 32 is mounted to the front portions of the slide bars 21. The bracket 32 has a vertically pivotal support shaft 31 that vertically pivotally supports the saw unit 30. The cutting unit 30 is biased by a spring toward an upward pivoted position.

The cutting unit 30 includes the saw blade 33 having a circular configuration and rotatably driven by an electric motor 38 as a drive source. The upper portion of the saw blade 33 is covered by a blade case 34. The lower portion of the saw blade 34 is covered by a movable cover 35 that can be opened and closed in response to the vertical movement of the cutting unit 30. A unit support 36 is provided integrally with the rear portion of the blade case 34. One end of the unit support 36 on the side opposite to the blade case 34 is supported by the bracket 32 via the vertically pivotal support shaft 31. In addition, a loop-shaped handle 37 is disposed on the upper portion of the blade case 34 and can be grasped by the operator. The electric motor 38 is driven to rotate the saw blade 33 when the operator operates or pulls a trigger type switch lever (not shown) disposed on the inner circumferential side of the handle 37. As the operator grasps the handle 37 and pivots the saw unit 30 downward, the movable cover 35 is opened to expose the lower portion of the saw blade 33, so that the workpiece W can be cut by pressing the exposed lower portion of the saw blade 33 against the workpiece W from the upper side.

Figure 2:
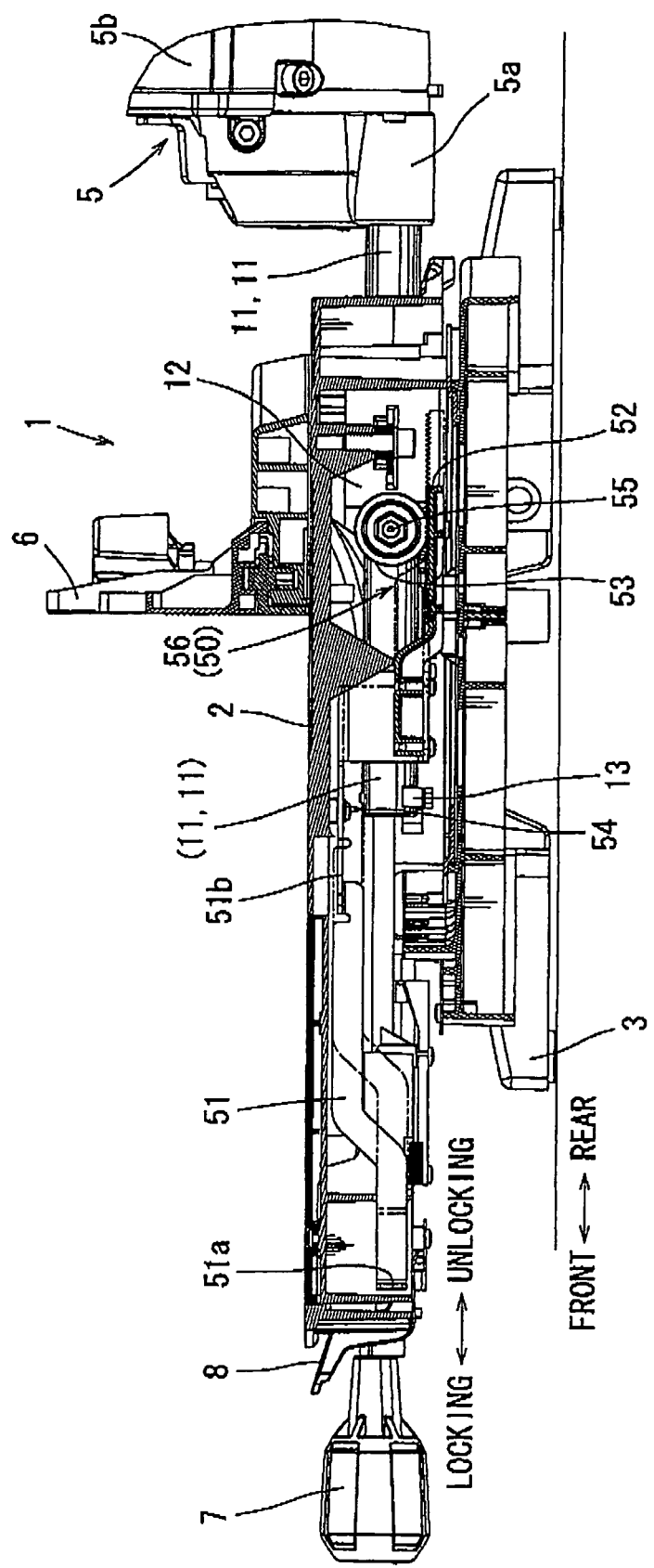
FIG. 2 is a vertical sectional view of a portion of the cutting device and showing a slide lock mechanism.
Figure 3:
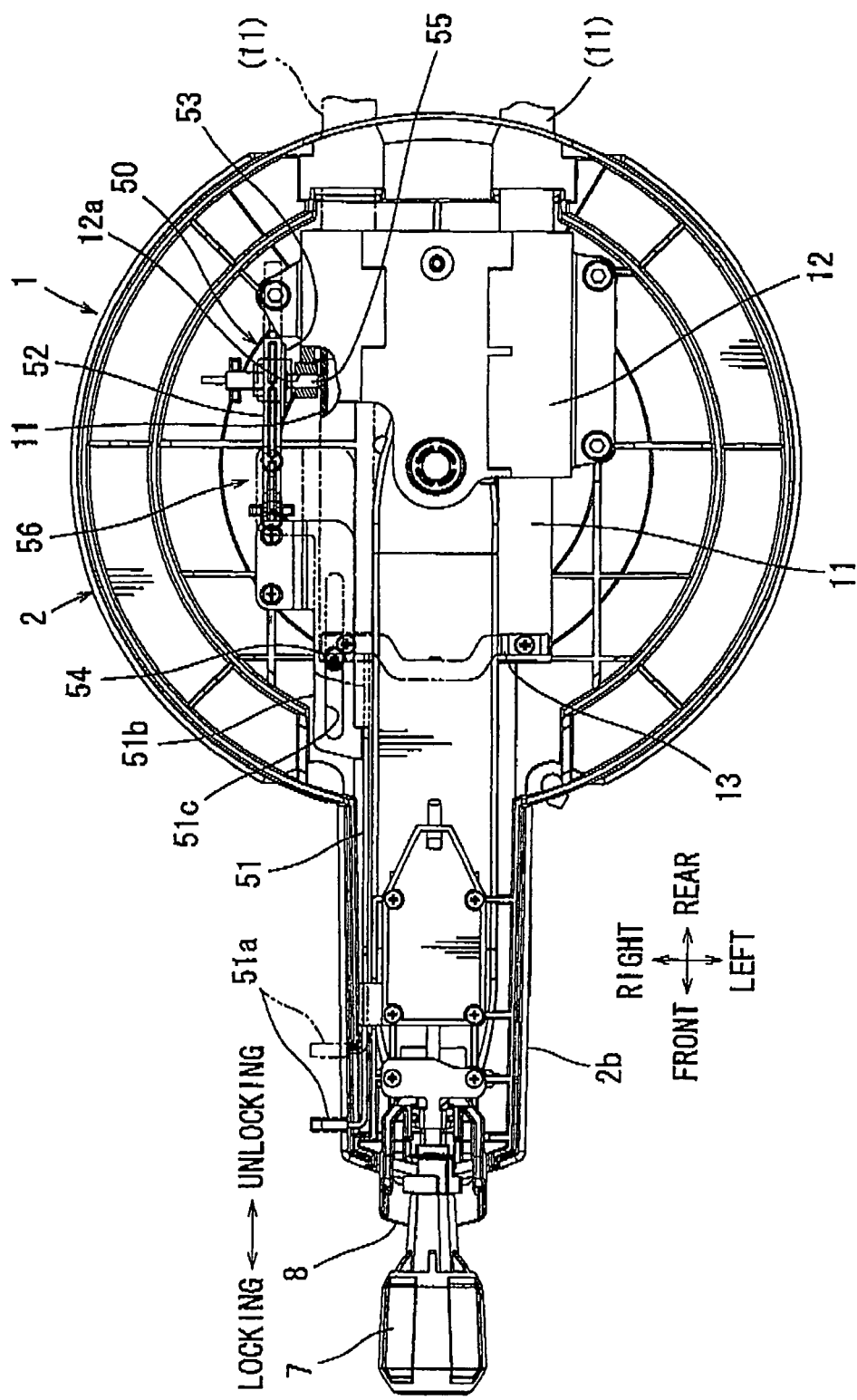
FIG. 3 is bottom view of the cutting device.

The saw unit 30 can be slid by a large distance in the cutting proceeding direction by using the upper and lower slide mechanisms 10 and 20. The details of the lower slide mechanism 10 are shown in FIGS. 2 and 3. As shown in these figures, a bearing portion 12 mounted to the lower surface of the table 2 slidably supports the slide bars 11 of the lower slide mechanism 10, so that the slide bars 11 can slidably move in the table surface direction. The rear portions of the slide bars 11 protrude rearwardly from the table 2 and their rear ends are coupled to the fixed member 5a of the left and right pivotal support mechanism 5. A coupling member 13 integrally couples the front ends of the slide bars 11 to each other. Therefore, the slide bars 11 can slide together in the cutting proceeding direction.

The sliding position of the slide bars 11 and eventually the sliding position of the cutting unit 30 can be locked at a desired position by a slide lock mechanism 50. As shown in FIGS. 2 and 3, the slide lock mechanism 50 includes an operation lever 51, a rack 52 and a pinion 53.

The operation lever 51 has a configuration elongated in front and rear directions and is supported within the extension 2a of the table 2 to extend along a right side wall of the extension 2a. The operation lever 51 can slide along the right side wall as will be explained later. The front end of the operation lever 51 is bent to have an L-shaped configuration and extends laterally outwardly from the extension 2a through the right side wall. The laterally outwardly extended end of the operation lever 51 is configured as an operation member 51a that can be operated by the operator. In the case of this embodiment, the operation member 51a is positioned on the right side of the extension 2a and proximal to the front end of the extension 2a. Therefore, the operator can hold the operation member 51a together with the grip 7 and the lever 8 without need of largely extending his or her arm. As a result, the operator can readily operate to slide the operation lever 51 while he or she takes a comfortable position.

The operation lever 51 is made of a strip material having a uniform width. The widthwise direction of the operation lever is oriented in the vertical direction. In other words, the thickness direction of the operation lever 51 is oriented in right and left directions. Therefore, the operation lever 51 is positioned away from a lower position of the blade intrusion slot of the blade intrusion plate 2b mounted to the upper surface of the extension 2a.

The rear portion of the operation lever 51 is bent into an L-shape to form a horizontal support portion 51b having an upper surface positioned along the lower surface of the table 2. A slot 51c elongated in the operational direction (front and rear directions) of the operation lever 51 is formed in the support portion 51b. A vertical support shaft 54 is mounted to the lower surface of the table 2 so as to be inserted into the slot 51c, so that the operator can move within such a range that the support shaft 54 can relatively move within the slot 51c.

The rear portion of the support portion 51b is bent further into an L-shape to form a vertically extending portion. The rack 52 is mounted to the lower part of the vertically extending portion and extends rearward (rightward as viewed in FIGS. 2 and 3) therefrom. The rack 52 has an upper side with teeth, with which the pinion gear 53 engages.

The pinion gear 53 is mounted to the lower surface side of the table 2 by a stopper screw 55 as will be explained later, so that the pinion gear 53 can rotate together with the stopper screw 55 about the axis of the stopper screw 55 relative to the lower surface of the table 2. Therefore, as the rack 52 moves in the front or rear direction by the sliding operation of the operation lever 51, the pinion gear 53 rotates to cause rotation of the stopper screw 55 in the tightening direction or the loosening direction.

More specifically, a threaded shank of the stopper screw 55 is engaged with a threaded hole 12a formed in a lateral side surface of the bearing portion 12. Therefore, as the stopper screw 55 is rotated in the tightening direction, a terminal end of its threaded shank abuts to a circumferential surface of one of the slide bars 11 positioned on the right side. Thus, as the tightening amount of the stopper screw 55 increases, the pressing force applied by the terminal end of the threaded shank against the circumferential surface of the right slide bar 11 increases, so that the slide bars 11 can be prevented from being moved to slide. In other words, the sliding operation of the lower slide mechanism 10 is prevented. On the other hand, as the stopper screw 55 is rotated in a loosening direction, the pressing force applied by the terminal end of the threaded shank of the stopper screw 55 to the circumferential surface of the right slide bar 11 decreases or the terminal end of the threaded shank moves away from the circumferential surface of the right slide bar 11 to allow the sliding movement of the slide bars 11. In other words, the sliding operation of the lower slide mechanism 10 is permitted.

As described above, according to the slide lock mechanism 50 associated with the lower slide mechanism 10, when the operator holds the operation member 51a with his or her fingertips and moves to slide the operation member 51a in the unlock direction (rearward in this embodiment), the operation lever 51 moves rearward (rightward in FIG. 2), so that the rack 52 moves together with the operation lever 51 in the same direction to cause rotation of the pinion gear 53 in a counterclockwise direction in FIG. 2. Then, the stopper screw 55 rotates relative to the threaded hole 12a in the loosening direction (unlock direction) to reduce the pressing force applied against the right slide bar 11 or to release the pressing force. As a result, the lower slide mechanism 10 is brought into an unlock state where the lower slide mechanism 10 is allowed for the sliding operation.

On the other hand, when the operator holds the operation member 51a with his or her fingertips and moves to slide the operation member 51a in the lock direction (forward in this embodiment), the operation lever 51 moves forward (leftward in FIG. 2), so that the rack 52 moves together with the operation lever 51 in the same direction to cause rotation of the pinion gear 53 in a clockwise direction in FIG. 2. Then, the stopper screw 55 rotates relative to the threaded hole 12a in the tightening direction (lock direction) to increase the pressing force applied against the right slide bar 11 or to be pressed against the right slide bar 11. As a result, the lower slide mechanism 10 is brought into a lock state where the lower slide mechanism 10 is prevented from performing the sliding operation.

In this way, the stopper screw 55 of the slide lock mechanism 50 serves as a stopper member. The rack 52 and the pinion gear 53 serve as primary components of a stopper moving mechanism 56.

As described above, according to the cutting device 1 of this embodiment, the cutting unit 30 can be moved forwardly and rearwardly by a large distance by way of the lower and upper slide mechanisms 10 and 20. In addition, the slide lock mechanism 50 associated with the lower slide mechanism 10 can be brought into the lock state and the unlock state by slidably operating the operation member 51a of the operation lever 51 in forward and rearward directions, respectively, and this operation can be made simply by fingertips of the operator. Thus, it is not necessary for the operator to rotate a screw or the like with his or her fingers. Therefore, the operability is improved.

In addition, because the operation member 51a of the operation lever 51 is positioned at the front end of the extension 2a, which can be easily accessed by the operator, the operator can easily operate the operation member 51a while he or she takes a comfortable position, without need of extending his or her arm, for example, to the rear portion of the table 2. Therefore, the operability of the slide lock mechanism 50 is improved also in this respect.

The above embodiment can be modified in various ways. For example, although the operation lever 51 is positioned to extend along the right wall of the extension 2a, the operation lever 51 may be positioned to extend along the left wall of the extension 2a. Otherwise, the operation lever 51 may be positioned to extend along the central portion with respect to a widthwise direction of the extension 2a. In such a case, it is possible to configure such that the operation member or the front end of the operation lever extends outwardly through the front wall of the extension 2a in order to enable the operator to push and pull the operation member for the sliding movement of the operation lever.

Further, although the slide lock mechanism 50 is constructed to lock and unlock the right slide bar 11, a slide lock mechanism similar to the slide lock mechanism 50 can be provided for locking and unlocking the left side bar 11. In such a case, it is possible to configure such that both slide lock mechanisms can be operated by the operation of a common operation member 51a.

A second embodiment of the present invention will now be described with reference to FIGS. 4 to 8. This embodiment is a modification of the first embodiment and is different from the first embodiment only in that the slide lock mechanism 50 is replaced with a slide lock mechanism 60. Therefore, in FIGS. 4 to 8, like members are given the same reference numerals as the first embodiment and the description of these member will not be repeated.

Figure 4:
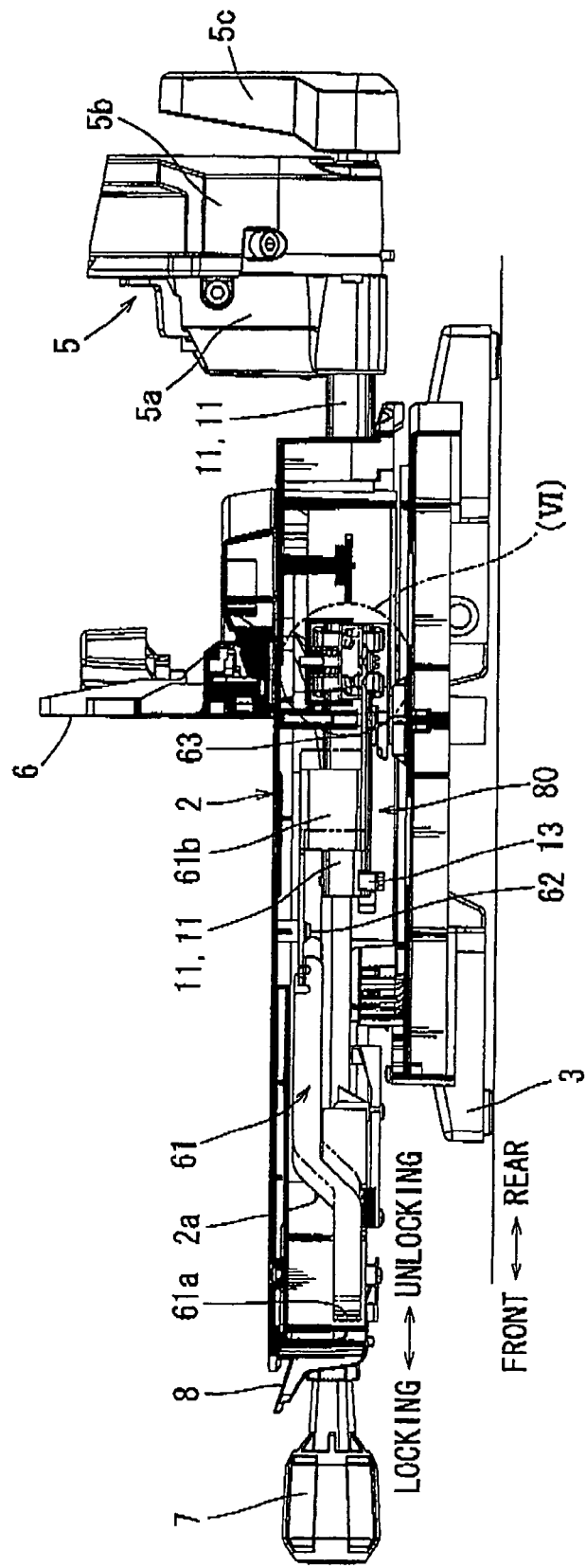
FIG. 4 is a vertical sectional view similar to FIG. 2 but showing a cutting device according to a second embodiment of the present invention.
Figure 5:
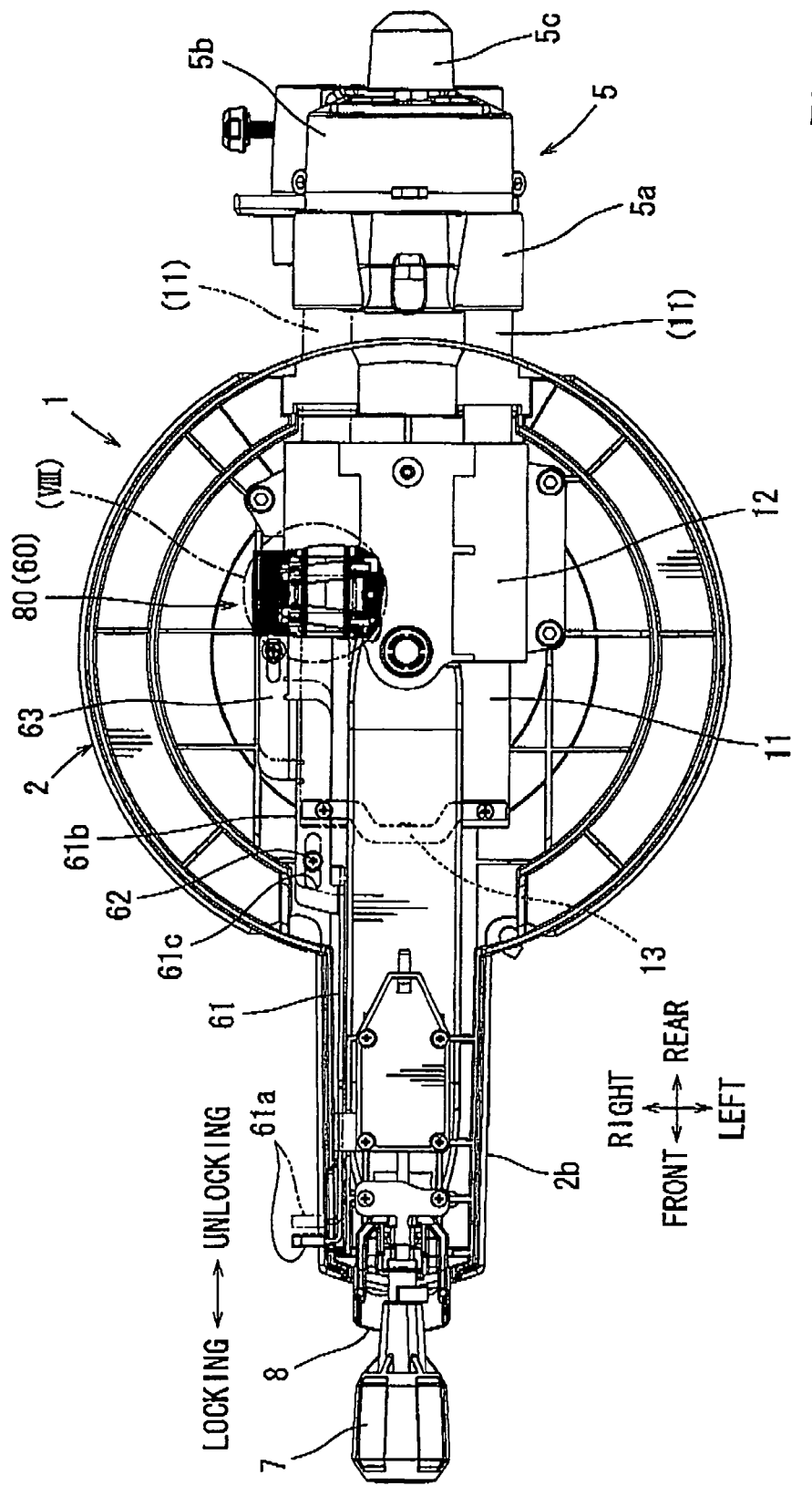
FIG. 5 is a bottom view of the cutting device shown in FIG. 4.
Figure 8:
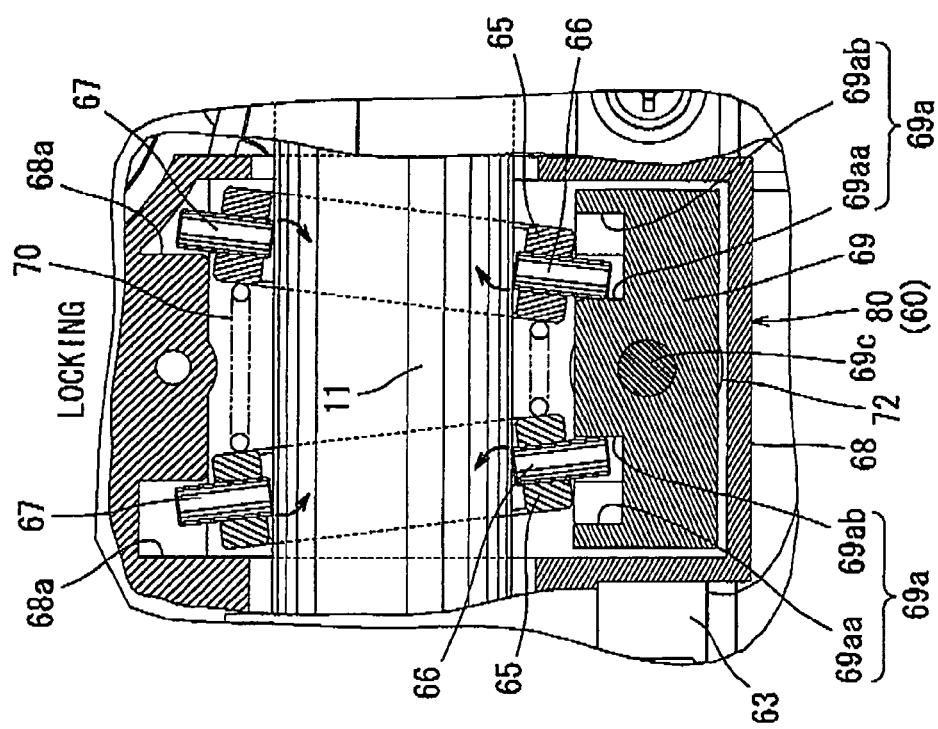
FIG. 8 is a sectional view as viewed from the lower side of the slide lock mechanism and showing the lock state, and corresponding to an enlarged view of a portion VIII in FIG. 5.

As shown in FIGS. 4 and 8, the slide lock mechanism 60 includes two stopper rings 65 and a stopper moving mechanism 80 that can move the stopper rings 65 between a lock position and an unlock position. Also in this embodiment, the stopper moving mechanism 80 includes an operation lever 61 that is disposed within the extension 2a of the table 2 and along the right wall of the extension 2a and is slidably movable in forward and rearward directions. The front end of the operation lever 61 is bent to have an L-shaped configuration and extends laterally outwardly from the extension 2a through the right wall. The laterally outwardly extended end of the operation lever 61 is configured as an operation member 61a that can be operated by the operator. Similar to the first embodiment, the operation member 61a is positioned on the right side of the extension 2a and proximal to the front end of the extension 2a.

The rear portion of the operation lever 61 is bent into an L-shape to form a horizontal support portion 61b. A slot 61c elongated in the operational direction (front and rear directions) of the operation lever 61 is formed in the support portion 61b. A vertical support shaft 62 is mounted to the lower surface of the table 2 so as to be inserted into the slot 61c, so that the operation can move within such a range that the support shaft 62 can relatively move within the slot 61c.

Figure 6:
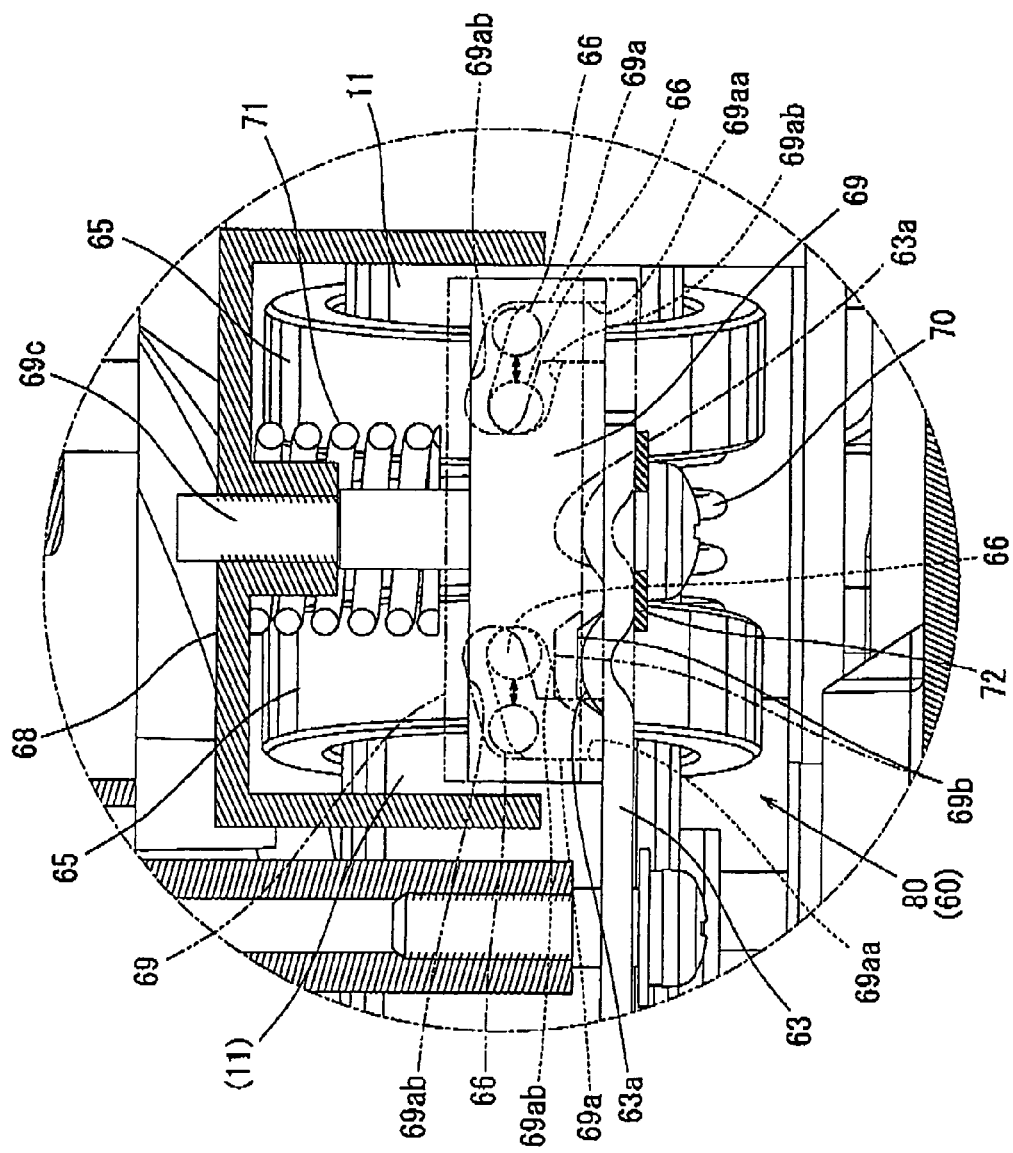
FIG. 6 is an enlarged view of a portion VI in FIG. 4 and showing a lock state of a slide lock mechanism.
Figure 7:
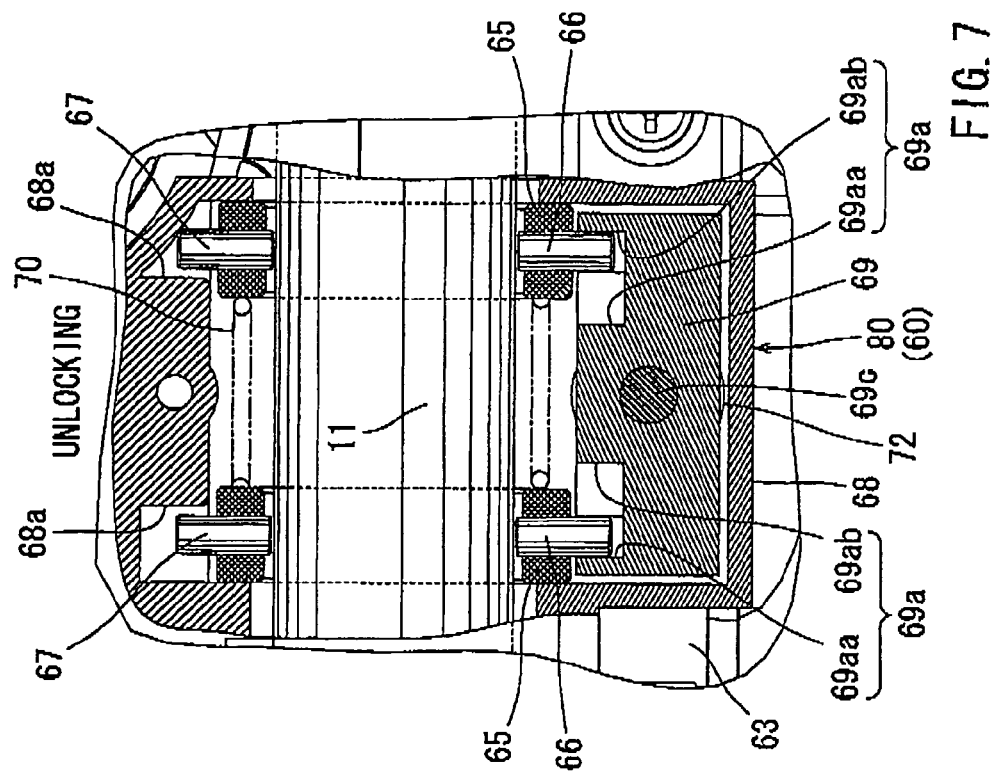
FIG. 7 is a sectional view as viewed from the lower side of the slide lock mechanism and showing an unlock state.

The rear portion of the support portion 61b is formed integrally with an operation arm 63 that extends rearwardly from the support portion 61b. The operation arm 63 is configured such that the two stopper rings 65 move between the lock position and the unlock position by the movement of the operation arm 63, i.e., by the sliding operation of the operation member 61a by the operator. These two stopper rings 65 and their associated construction are shown in FIGS. 6 to 8. Referring to FIG. 6, an engaging projection 63a extends upward (toward the lower surface of the table 2) from the rear end (right end in FIG. 6) of the operation arm 63.

On the other hand, a holder frame 68 is formed integrally with the bearing portion 12 disposed on the lower surface of the table 2. The right slide bar 11 extends through the holder frame 68. The two stopper rings 65 are loosely fitted around the right slide bar 11 and are positioned within the holder frame 68. As shown in FIG. 6, each of the stopper rings 65 has an annular configuration and has an inner diameter larger enough than the outer diameter of the right slide bar 11. With this arrangement, each of the stopper ring 65 can incline relative to the right slide bar 11 between the unlock position where an axis of each stopper ring 65 coincides or substantially coincides with the axis of the right slide bar 11 as shown in FIG. 7 and the lock position where the axis of each stopper ring 65 is inclined relative to the axis of the right slide bar 11 by a predetermined angle as shown in FIG. 8.

A compression spring 70 is fitted around the right slide bar 11 and is interleaved between the stopper rings 65, so that the stopper rings 65 are biased toward the unlock position where the stopper rings 65 are positioned substantially parallel to each other. The stopper rings 65 can be inclined from the unlock position to the lock position against the biasing force of the compression spring 70 as will be explained later.

An engaging pin 66 and a support pin 67 are fixedly mounted to each of the stopper rings 65. In each of the stopper rings 65, the engaging pin 66 and the support pin 67 are positioned to be opposed to each other in the diametrical direction and are oriented in the radial direction such that the engaging pin 66 and the support pin 67 extend through the thickness of the corresponding stopper ring 65 in the radial direction. Therefore, in each of the stopper rings 65, the engaging pin 66 and the support pin 67 extend along the same axis. More specifically, each of the engaging pin 66 and the support pin 67 extends radially outward from the outer circumferential surface of the stopper ring 65 by a large distance and extends radially inwardly from the inner circumferential surface of the stopper ring 65 by a little distance.

The engaging pins 66 of the stopper rings 65 are inserted into corresponding switching grooves 69a formed in a switching block 69. The support pins 67 of the stopper rings 65 are inserted into corresponding support holes 68a formed in the inner wall of the holder frame 68.

As shown in FIG. 6, the switching block 69 has a support shaft 69c that extends upward from the upper surface of the switching block 69. The support shaft 69c is vertically movably inserted into the holder frame 68, so that the switching block 69 can move in parallel in the vertical direction. A compression spring 71 is fitted around the support shaft 69c so as to be interleaved between the upper surface of the switching block 69 and the upper wall of the holder frame 68, so that the switching block 69 is normally biased downward by the compression spring 71. The operation arm 63 is positioned on the lower side of the switching block 69, so that the operation arm 63 is in contact with the lower surface of the switching block 69. A support plate 72 is mounted to the support shaft 69c so as not to move downward relative thereto. The support plate 72 supports the operation arm 63 from the lower side. Therefore, the switching block 69 is pressed against the operation arm 63 by the biasing force of the compression spring 71.

As described previously the engaging projection 63a is formed on the operation arm 63. An engaging recess 69b is formed in the lower surface of the switching block 69 for engaging with the engaging projection 63a. As indicated by solid lines in FIG. 6, in the state that the operation arm 63 is positioned at a forward position (lock position), the engaging projection 63a engages the engaging recess 69b, so that the switching block 69 is positioned at a lowest position. On the other hand, when the operation arm 63 moves to a rearward position (unlock position) indicated by chain lines in FIG. 6, the engaging projection 63a is disengaged from the engaging recess 69b and contacts with the other region having no recess of the lower surface of the switching block 68. Therefore, the switching block 69 is shifted upward by a distance corresponding to the height of the engaging projection 63a against the biasing force of the compression spring 71.

The stopper rings 65 can move between the lock position and the unlock position as the switching block 69 moves vertically between two different positions. As described previously, the engaging pins 66 of the stopper rings 65 are inserted into the corresponding switching grooves 69a formed in the switching block 69. As shown in FIGS. 6 to 8, the switching grooves 69a are formed in the inner surface (the surface opposed to the stopper rings 65) of the switching block 69 and are positioned to be symmetrical with each other with respect to the support shaft 69c. Each of the switching grooves 69a includes a vertical portion 69aa and an oblique portion 69ab that extends obliquely upward from the upper end of the vertical portion 69aa. More specifically, the oblique portions 69ab of the switching grooves 69a extend obliquely upward toward each other.

Because the stopper rings 65 are biased in directions away from each other by the compression spring 70, their engaging pins 66 are urged in directions away from each other. Therefore, when the operation arm 63 is in the unlock position and the switching block 69 is positioned at the unlock position (upper position) indicated by chain lines in FIG. 6, the engaging pins 66 are spaced away from each other by the compression spring 70 so as to be positioned at the upper portions of the corresponding vertical portions 69aa of the switching grooves 69a. In this state, the axes of the stopper rings 65 coincide or substantially coincide with the axis of the right slide bar 11. Therefore, the engaging pins 66 and the support pins 67 of the stopper rings 65 are not pressed against the right slide bar 11 or do not contact with the right slide bar 11. Hence, the right slide bar 11 is allowed for sliding movement. In other words, the lower slide mechanism 10 is in the unlock state.

On the other hand, when the operation arm 63 is moved to the lock position indicated by solid lines in FIG. 6, the engaging projection 63a moves to a position to oppose to the lower side of the engaging recess 69b of the switching block 69. Therefore, the switching block 69 moves downwardly to the lock position indicated by solid lines in FIG. 6 by the biasing force of the compression spring 71 and the engaging recess 69b is brought to engage with the engaging projection 63a. As the switching block 69 moves to the lock position, due to the cam action of the oblique portions 69ab of the switching grooves 69a, the engaging pins 66 move toward each other, so that the stopper rings 65 are inclined against the biasing force of the compression spring 70 as shown in FIG. 8. Thus, the axes of the stopper rings 65 are inclined relative to the axis of the right slide bar 1.

As the stopper rings 65 are inclined, corner portions of radially inner ends of the engaging pins 66 and the support pins 67 each protruding radially inwardly from the inner circumference of the corresponding stopper ring 65 by a small distance are pressed against the circumferential surface of the slide bar 11. As described previously, the switching block 69 is biased downwardly (toward the lock position) by the compression spring 71. Therefore, by the indirect action of the compression spring 71, the corner portions of the inner ends of the engaging pins 66 are pressed against the right slide bar 11 in such away that they engage with the circumferential surface of the right slide bar 11. On the other hand, the action of the compression spring 71 directly acts on the support pins 67, so that the support pins 67 are pressed against the right slide bar 11 to engage with the circumferential surface of the right slide bar 11.

In this way, because the corner portions of the inner ends of the engaging pins 66 and the support pins 67 are pressed against the circumferential surface of the right slide bar 11 to engage therewith, the right slide bar 11 is prevented from sliding movement, and eventually, the lower slide lock mechanism 10 is brought into the lock state.

As indicated by arrows in FIG. 8, the engaging pins 66 of the stopper rings 65 engage with the circumferential surface of the right slide bar 11 from opposite sides with respect to the moving direction of the slide bar 11. Also, the support pins 67 engage with the circumferential surface of the right slide bar 11 from opposite sides with respect to the moving direction of the slide bar 11. Therefore, in this lock state, the sliding movement of the right slide bar 11 is reliably prevented in either direction.

The movement of the operation arm 63 occurs as the operator slidably moves the operation member 61a that can be easily accessed by the operator. When the operator operates the operation member 61a to slide rearward, the operation arm 63 moves together with the operation member 61a in the same direction, so that the lower slide mechanism 10 is brought into the unlock state. On the other hand, when the operator operates to the operation member 61a to slide forward, the operation arm 63 moves together with the operation member 61a in the same direction, and therefore, the switching block 69 moves downward to incline the stopper rings 65, so that the lower slide mechanism 10 is brought into the lock state.

According to the slide lock mechanism 60 of the cutting device 1 of the second embodiment constructed as described above, it is possible to bring the lower slide mechanism 10 into the lock state or the unlock state by the operation of the operation member 61a to cause sliding movement of the operation lever 61. Similar to the first embodiment, the operator can operate the operation member 61a simply by fingertips of the operator. Thus, it is not necessary for the operator to rotate a screw or the like with his or her fingers. Therefore, it is possible to improve the operability.

In addition, similar to the first embodiment, the operation member 61a of the operation lever 61 is positioned at the front end of the extension 2a, which can be easily accessed by the operator. Therefore, the operator can easily operate the operation member 61a while he or she takes a comfortable position, without need of extending his or her arm, for example, to the rear portion of the table 2. Therefore, the operability of the slide lock mechanism 60 is improved also in this respect.

Further, in the case of the second embodiment, the stopper rings 65 are not directly pressed against the right slide bar 11 but the engaging pins 66 and the support pins 67 having a diameter or a size in the axial direction of the slide bar 11, which is smaller than the width of the stopper rings 65, are pressed against the slide bar 11 for locking the slide bar 11. Therefore, it is possible to lock the slide bar 11 by a large engaging force, and eventually, the slide lock mechanism 60 can reliably operate with a large locking force.

Furthermore, in the case of the second embodiment, the two stopper rings 65 are inclined in opposite directions in the axial direction of the slide bar 11. Therefore, the engaging pins 66 are pressed against the slide bar 11 from the opposite sides with respect to the axial direction of the slide bar 11, and the support pins 67 are also pressed against the slide bar 11 from the opposite sides with respect to the axial direction of the slide bar 11. As a result, it is possible to reliably lock the sliding movement of the slide bar 11 for either of the forward and rearward sliding direction.

Also, various modifications can be made to the second embodiment. For example, although two stopper rings 65 are used in this embodiment, it is possible to use only one stopper ring. In addition, although the stopper rings 56 are inclined in opposite directions for locking the sliding movement of the slide bar 11, it is possible to achieve the lock state by inclining the stopper rings 56 in the same direction.

Further, although the stopper rings 65 do not directly engage the slide bar 11 but the engaging pins 66 and the support pins 67 mounted to the stopper rings 65 engage the slide bar 11, it may be possible to directly engage the stopper rings 65 by eliminating the inwardly protruding portions of the pins 66 and 67, which protrude from the inner circumferences of the stopper rings 65.

Furthermore, although the operation lever 61 is positioned to extend along the right wall of the extension 2a, the operation lever 61 may be positioned to extend along the left wall of the extension 2a. Otherwise, the operation lever 61 may be positioned to extend along the central portion with respect to a widthwise direction of the extension 2a. Further, although the slide lock mechanism 60 is constructed to lock and unlock the right slide bar 11, a slide lock mechanism similar to the slide lock mechanism 60 can be provided for locking and unlocking the left side bar 11. In such a case, it is possible to configure such that both slide lock mechanisms can be operated by the operation of a common operation member 61a.

Further, although in the first and second embodiments, the operation member 51a (61a) is slid to move linearly in the forward and rearward directions for the lock and unlock operations, the operation member may be slid to move along an arc shaped path or may be slide to pivot, and a suitable link mechanism may be interleaved between the operation member and the operation lever.

Furthermore, although the cutting devices of the first and second embodiments have the upper and lower slide mechanisms, the present invention also may be applied to a cutting device having only a lower slide mechanism. In addition, although the cutting devices of the first and second embodiments are configured to have the right and left pivotal support mechanism 5 that enables an oblique cutting operation with the saw unit inclined relative to the vertical direction, the present invention also may be applied to a cutting device that does not have a right and left pivotal support mechanism and can only perform a vertical cutting operation.

This invention claims:
1. A cutting device comprising:
a table configured to be able to place a workpiece thereon;
a cutting unit disposed on an upper side of the table and vertically movably supported by the table via a slide mechanism; and
a slide lock mechanism configured to lock and unlock the sliding movement of the cutting unit and including an operation member operable to slide in parallel to a sliding direction without being rotated for locking and unlocking the sliding movement,
wherein:
the slide mechanism is configured to enable the cutting unit to slide in the sliding direction relative to the table within a plane substantially parallel to a surface of the table;
the slide mechanism comprises a slide bar slidably disposed along a lower surface of the table, so that the cutting unit can slide in the sliding direction relative to the table via the slide bar;
the slide lock mechanism further includes a stopper member and a stopper moving mechanism operable to move the stopper member between a lock position and an unlock position;
when the stopper member is in the lock position, the stopper member engages the slide bar for preventing the sliding movement of the slide bar;
when the stopper member is in the unlock position, the stopper member permits the sliding movement of the slide bar;
the stopper member comprises a stopper screw;
the stopper moving mechanism comprises a pinion gear mounted to the stopper screw and a rack engaging with the pinion gear and coupled to the operation member;
when the operation member is slid to move into a first position, the rack moves to cause the stopper screw to move to the lock position where the stopper screw abuts to the slide bar; and
when the operation member is slid to move into a second position which is a position opposite in direction to a first position, the rack moves to cause the stopper screw to move to the unlock position where the stopper screw permits the sliding movement of the slide bar.

2. The cutting device as in claim 1, wherein the operation member is disposed at a front position on a side of an operator with respect to the sliding direction, so that the operator can readily access the operation member.

3. The cutting device as in claim 1, wherein:

the operation member is disposed at a front position on a side of an operator with respect to the sliding direction, so that the operator can readily access the operation member; and the slide lock mechanism further includes an operation lever coupled between the operation member and the rack, so that the movement of the operation member is transmitted to the rack via the operation lever.

* * * * *